United States Patent
Nankawa et al.

(10) Patent No.: US 6,574,592 B1
(45) Date of Patent: Jun. 3, 2003

(54) VOICE DETECTING AND VOICE CONTROL SYSTEM

(75) Inventors: Keigo Nankawa, Tokyo-To (JP); Masaki Saito, Sagamihara (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/531,445

(22) Filed: Mar. 20, 2000

(30) Foreign Application Priority Data

Mar. 19, 1999 (JP) ............................................. 11-076008

(51) Int. Cl.$^7$ .......................... G10L 11/00; G10L 15/20
(52) U.S. Cl. ........................ 704/206; 704/275; 708/309
(58) Field of Search .............................. 704/205, 206, 704/207, 208, 210, 214, 215, 246, 248, 270, 275; 708/300, 320, 309; 379/80

(56) References Cited

U.S. PATENT DOCUMENTS

| | | | | |
|---|---|---|---|---|
| 4,100,370 A | * | 7/1978 | Suzuki et al. ................ | 382/115 |
| 4,296,277 A | * | 10/1981 | Daneffel ....................... | 379/80 |
| 5,548,647 A | * | 8/1996 | Naik et al. ................... | 340/5.52 |
| 5,910,904 A | * | 6/1999 | Uramoto ...................... | 708/300 |
| 6,023,671 A | * | 2/2000 | Iijima et al. ................. | 704/208 |
| 6,182,035 B1 | * | 1/2001 | Mekuria ....................... | 704/230 |
| 6,385,548 B2 | * | 5/2002 | Ananthaiyer et al. ......... | 702/73 |

FOREIGN PATENT DOCUMENTS

| | | |
|---|---|---|
| JP | 55-13562 | 1/1980 |
| JP | 61-271781 | 12/1986 |
| JP | 62-171010 | 7/1987 |
| TW | 281327 | 10/1996 |

OTHER PUBLICATIONS

Lee et al., "A voice activity detection algorithm for communication systems with dynamically varying background acoustic noise," May 1998, 48th IEEE Vehicle Technology Conference, vol. 2, pp. 1214 to 1218.*

* cited by examiner

Primary Examiner—Marsha D. Banks-Harold
Assistant Examiner—Martin Lerner
(74) Attorney, Agent, or Firm—Oblon, Spivak, McClelland, Maier & Neustadt, P.C.

(57) ABSTRACT

The voice detecting device includes a voice frequency detector for detecting the frequency of the input voice, then discriminating whether the detected frequency falls within a preset frequency range of voices to be detected, and outputting the result of the discrimination; an input signal level detector for detecting the energy level of the input voice, then comparing it to confirm whether the detected energy level exceeds a preset energy level threshold value of voices to be detected, and outputting the result of the comparison; a voice input judge part responsive to the result of discrimination and the result of comparison to judge whether a voice satisfying conditions for voice detection has been input or not, and output a first status signal in accordance with the result of the judgement; and a voice duration measure part for measuring the duration of the first status signal, then comparing it to confirm whether the detected duration falls within a preset range of duration threshold value, and outputting a second status signal in accordance with the result of the comparison. The voice control system includes a microphone for introducing a voice, the voice detecting device according to the invention, a control means responsive to one or both of the first status signal and second status signal to determine whether to output a control command, and a controlled objective which executes an operation according to the control command.

1 Claim, 4 Drawing Sheets

VOICE DETECTING AND VOICE CONTROL SYSTEM

BACKGROUND OF THE INVENTION

The present invention relates to a voice detecting device for voice detection for the purpose of remote control by predetermined voices to an apparatus normally requiring manual control, and a voice control system using the voice detecting device.

There are voice control systems using voice detection as existing technologies for remote control by voices of apparatuses or appliances normally requiring manual control.

FIG. 1 is a block diagram showing the structure of an existing voice control system.

The existing voice control system includes a microphone 30 for inputting voices and a personal computer 31 for various kinds of processing such as detecting and identifying an input voice, control responsive to the result of identification, and so on.

The personal computer 31 includes a central processing unit (CPU) 32 for various operations, a memory 33 for storing various data, a controlled objective block 34 to be controlled by voice detection, and other block 35.

For conducting control by voice detection, a plurality of comparison voice data to be compared with input voice data are previously stored in the memory 33 to enable detection and identification of the voices. A part of CPU 32 is used as a voice detection block 32a for detecting and identifying an input voice and executing a control responsive to the identification result.

When a voice of a plurality of words or syllables by a speaker is input through the microphone 30, the voice detection block 32a detects the input voice data, and compare it with individual comparison voice data read out from the memory 33 to determine whether there is any that corresponds to it. If there is a comparison voice data which corresponds to the input voice data, a control command (manipulation command) corresponding to the comparison voice data is output to the controlled objective block 34. The controlled objective block 34 supplied with the control command works according to the control command.

Voice control systems of the above-introduced type need the ability of operation processing of several decade MIPS through several hundred MIPS and memory resources of several decade kB. In large-scale systems such as personal computers, the resources used for voice detection is only a small part of the maximum resources of the entire system, and the said need does not invite enlargement of the systems or increase their costs.

Small-scale systems, however, which are intended only for detection of a few manipulation commands, do not need large-scale voice detection systems as those used in personal computers. In an extreme case, inexpensive voice detection means sufficient to attain only one manipulation are sometimes demanded.

Heretofore, however, in case of detecting voices of words or syllables from unspecified persons, resources required for realization thereof, such as operation processing abilities of CPU, memory capacities, and so forth, were enormous, and it invited a significant increase of the cost and scale of systems for remote control by voices.

SUMMARY OF THE INVENTION

It is therefore an object of the present invention to provide a voice detecting device and a voice control system which are simple in construction and inexpensive by making limitations in property of input voices in terms of frequency, magnitude, length, and so on.

According to the invention, there is provided a voice detecting device comprising:

a voice frequency detector for detecting the frequency of a voice input thereto, then discriminating whether the frequency falls within a preset frequency range for voices to be detected, and outputting the result of the discrimination;

an input signal level detector for detecting the energy level of the input voice, then comparing it to confirm whether the detected energy level exceeds a preset energy level threshold value for voices to be detected, and outputting the result of the comparison;

a voice input judge part responsive to the result of discrimination by the voice frequency detector and the result of comparison by the input signal level detector to judge whether a voice satisfying conditions for voice detection has been input or not and output a first status signal in accordance with the result of the judgement; and a voice duration measure part for measuring the duration of the first status signal, then comparing it to confirm whether the detected duration falls within a preset range of duration threshold value, and outputting a second status signal in accordance with the result of the comparison, and by providing limitations to detected voices in frequency, magnitude, length and other detecting conditions, it is possible to significantly decrease the enormous amount of operations caused by the dictionary memory and complicated detection algorithms as compared with existing techniques and thereby realize voice control by using simple and light system resources at a low cost. Therefore, it is possible to provide a voice detecting device for remote control by voices from unspecified persons to an apparatus normally requiring manual control with a simple structure at a low cost.

If the device is designed to permit changes of the frequency range of detected voices, energy level threshold value and duration threshold value of detected voices, the detected objective voices can be limited in a range for each purpose. That is, by designing the device to be changeable in frequency range of detected voices relative to frequencies of voices to be detected, detection adaptive to a specific speaker, detection adaptive to genders to a certain level, and so on, are possible. By designing the device to be changeable in level threshold value relative to the magnitude of the voice to be detected, erroneous detection of noise other than voices and detection of low voices below a predetermined level, for example, can be prevented. Furthermore, by designing the device to be changeable in threshold value of the duration of voices to be detected, it is possible to alleviate the processing load of a timer or a counter in the control means, or detect only voices of lengths within a predetermined time and thereby prevent erroneous detection.

The voice frequency detector is preferably a digital filter including a band pass filter block for setting the frequency range of voices to be detected and supplied with a voice, and an energy estimator for identifying a voice from a signal coming through the band pass filter block.

The voice control system according to the invention includes a microphone for introducing a voice, a voice detecting device according to the invention, a control means responsive to one or both of the first status signal and the second status signal to determine whether to output a control command, and a controlled objective which executes an operation according to the control command, and with this structure, the invention can provide an inexpensive voice control system with a simple structure for remote control by voices of unspecified speakers about an apparatus normally controlled manually.

BRIEF DESCRIPTION OF THE DRAWINGS

In the attached drawings.

DESCRIPTION OF THE PREFERRED EMBODIMENTS

A voice detecting device and a voice control system according to the invention are explained below with reference to the attached drawings.

Figure 1:
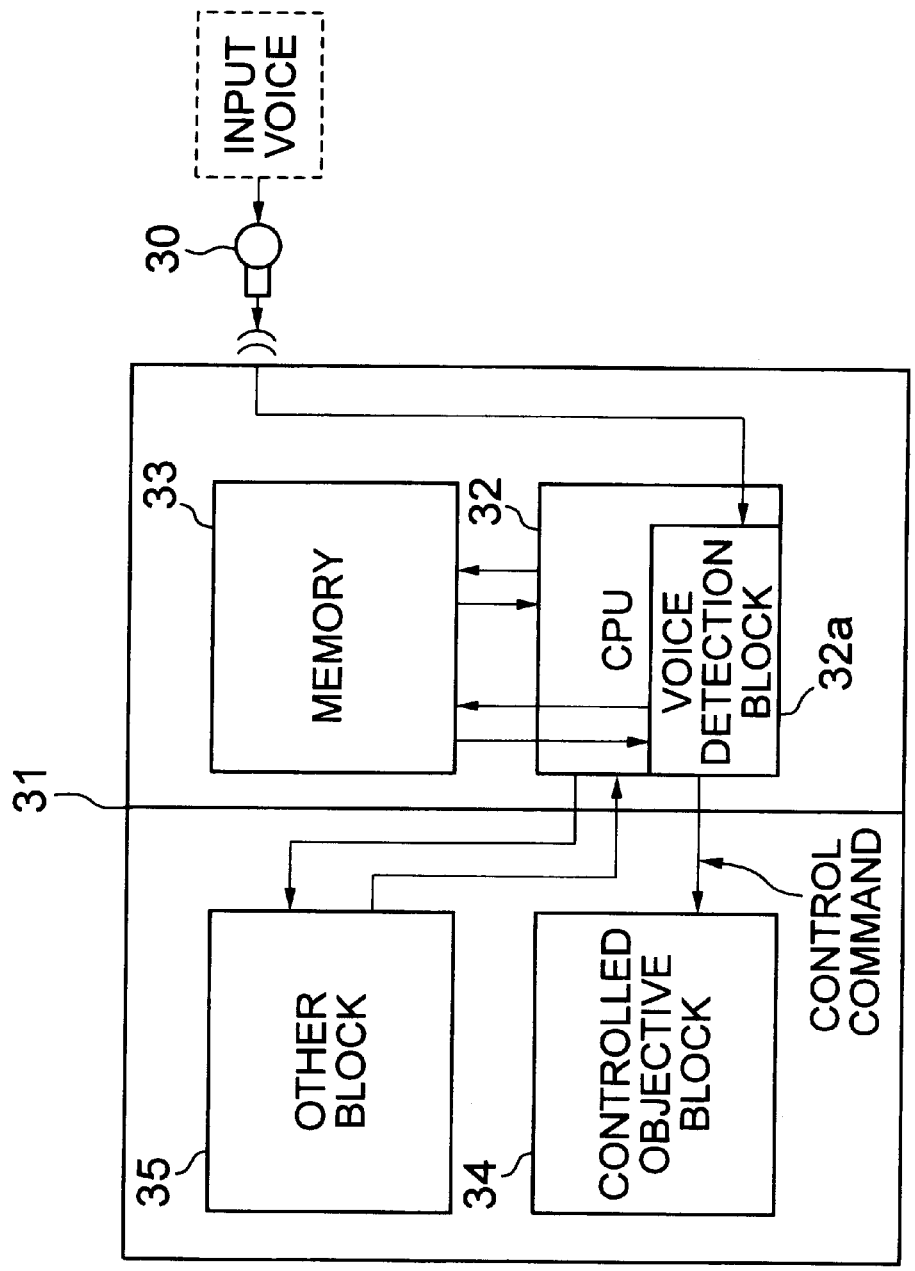
FIG. 1 is a block diagram showing the structure of an existing voice control system.
Figure 2:
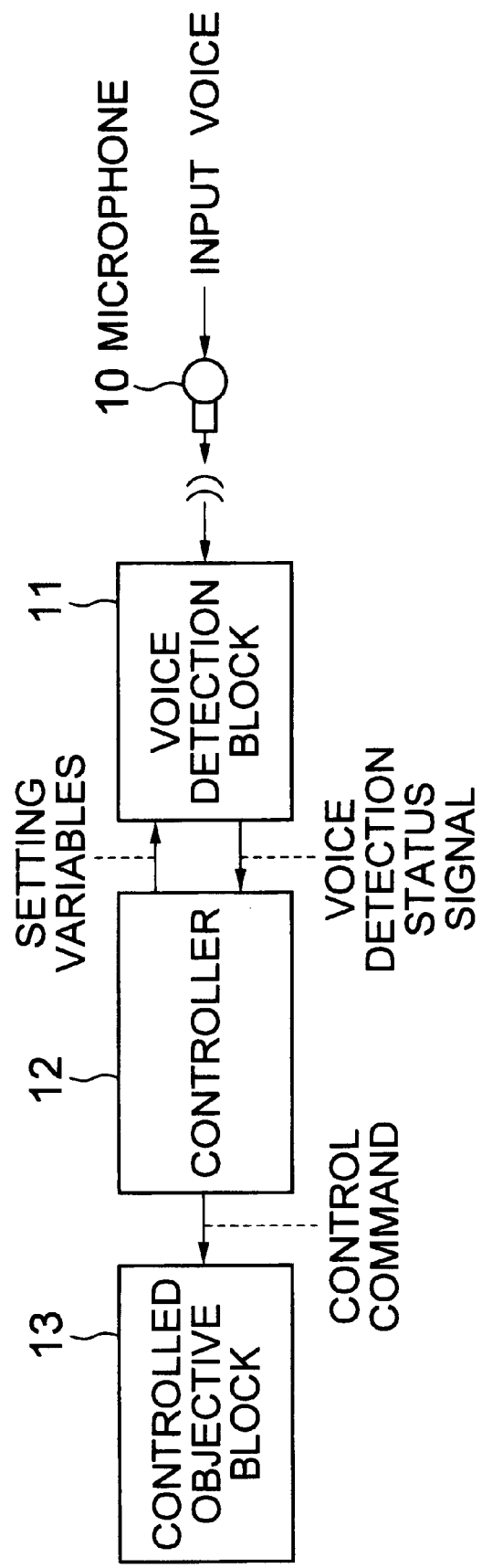
FIG. 2 is a block diagram showing the structure of a voice control system according to the invention.

FIG. 2 is a block diagram showing the structure of the voice control system according to the present invention.

The voice control system according to the present invention includes a microphone 10 for introducing voices, a voice detection block 11 for detecting an input voice and outputting a voice detection status signal based on the result of the detection, a control means 12 for setting conditions for voice detection and outputting a control command responsive to the voice detection status signal, and a controlled objective block 13 controlled by the control command based on the voice detection. Used as the voice detection block 11 is a voice detecting device according to the invention explained later. Conditions for voice detection in the voice detecting block 11 are set by the control means 12.

In the voice control system according to the present invention, when a voice input through the microphone 10 is detected to be a voice meeting the predetermined conditions for voice detection in the voice detecting block 11, the voice detection block 11 outputs a voice detection status signal responsive to a detected voice to the control means 12. The control means 12 outputs to the controlled objective block 13 the control command responsive to the input voice detection status signal, and the controlled objective block 13 in receipt of the control command behaves according to the control command.

Figure 3:
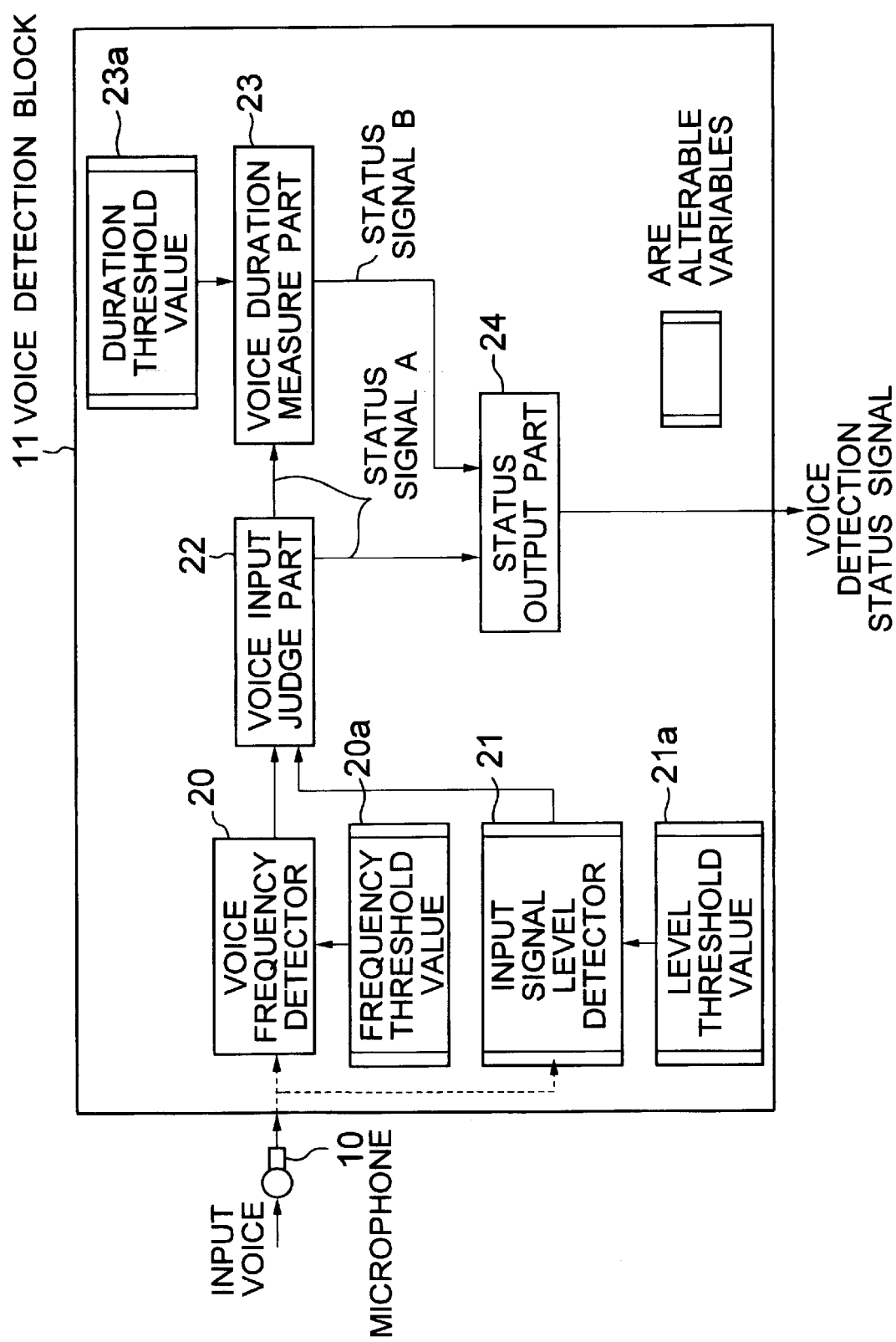
FIG. 3 is a block diagram showing the structure of a voice detecting device according to the present invention.

FIG. 3 is a block diagram showing the structure of a voice detecting device according to the present invention. The voice detection block 11 shown in FIG. 2 is the voice detecting device according to the invention.

The voice detecting device according to the present invention (voice detection block 11) includes a voice frequency detector 20 for detecting the frequency of a voice input through the microphone 10, then discriminating whether the frequency falls in a predetermined frequency range for voices to be detected, and outputting its result; an input signal level detector 21 for detecting the energy level of the voice input through the microphone 10, then conducting comparison to confirm whether the energy level exceeds a predetermined threshold value, and outputting its result; a voice input judge part 22 responsive to the result of the discrimination by the voice frequency detector 20 and the result of the comparison by the input signal level detector 21 to judge entry of a voice meeting the voice detecting conditions and output a status signal A in response to the judgement; a voice duration measure part 23 for measuring the duration of the status signal A, then conducting comparison to confirm whether the duration falls in a predetermined range of duration threshold values, and outputting a status signal B in accordance with the result of the comparison; and a status output part 24 for outputting to the control means 12 the status signal A from the voice input judge part 22 and the status signal B from the voice duration measure part 23 as a voice detection status signal.

Behaviors of the voice detecting device according to the present invention are as follows.

The voice frequency detector 20 is a filter having a frequency threshold value 20a set by the control means 12 (see FIG. 2). By detecting the energy component of the voice input through the microphone 10, the voice frequency detector 20 monitors and determines whether its frequency falls within the upper and lower limits of the detection voice frequency range determined by the frequency threshold value 20a, and outputs to the voice input judge part 22 the result of the discrimination whether the frequency of the input voice satisfies the conditions for detection.

The input signal level detector 21 detects the energy level of the voice input through the microphone 10, then makes comparison to confirm whether the detected energy level exceeds the detection energy level threshold value 21a predetermined by the control means 12, and outputs the result of the comparison to the voice input judge part 22.

Based on the outputs from the voice frequency detector 20 and the input signal level detector 21, the voice input judge part 22 judges that a voice satisfying the voice detecting conditions has been input and outputs the status signal A to the voice duration measure part 23 and the status output portion 24 when both the result of discrimination by the voice frequency detector 20 and the result of comparison by the input signal level detector 21 satisfy the voice detecting conditions.

The voice duration measure part 23 measures the duration of the status signal A input from the voice input judge part 22, then compares it to confirm whether the it falls within the upper and lower limits of the duration of detected voices determined by the duration threshold value 23a preset by the control means 12, and outputs the status signal B to the status output portion 24 when the result of the comparison demonstrates that it falls within the range of the duration threshold value 23a.

The status output part 24 outputs the supplied status signal A and status signal B as a voice detection status signal to the control means 12. The control means 12 may determine whether to output the control command or not to the controlled objective in response to one or both of the status signal A and the status signal B.

In case of the configuration like this embodiment, the voice duration measure part 23 outputs the status signal B upon the duration of the status signal A being within the range of duration threshold value. And, if the voice duration measure part 23 is provided the controller, for example, outside the voice detecting device, the controller can confirm entry of a voice with its own duration threshold value by taking in the status signal A output from the voice detecting device into its own voice duration measure part and measuring the duration. In this case, therefore, the controller, or the like, need not monitor the status signal B. If the voice duration measure part 23 is not provided the controller, for example, outside the voice detecting device, the controller can confirm the entry of the voice by setting a duration threshold value of the voice detecting device and monitoring the output status signal B. In this case, therefore, the control means, or the like, need not monitor the status signal A.

The control means 12 shown in FIG. 2 determines whether to output a control command to the controlled objective block 13 in response to one or both of the status signal A and the status signal B input from the voice detection block 11 as a voice detection status signal. Typically, when all voice detecting conditions about frequencies, energy levels and duration of voices are satisfied and the status signal B is input as the voice detection status signal from the voice detection block 11, the control means outputs a certain control command to the controlled objective block 13.

For voice control by voices of various speakers, voice control by only one or some specified speakers or voice control by voices of many and unspecified speakers can be enabled by changing the preset detection voice frequency range in the voice frequency detector 20.

Further, by changing the preset detection energy level threshold value in the input signal level detector 21, erroneous detection of noise other than voices can be prevented, or detection of low voices below a certain level can be prevented.

Furthermore, by changing the preset duration threshold value in the voice duration measure part 23, it is possible to alleviate the processing load of a timer or a counter in the control block 12 or detect only voices with lengths within a predetermined range.

Figure 4:
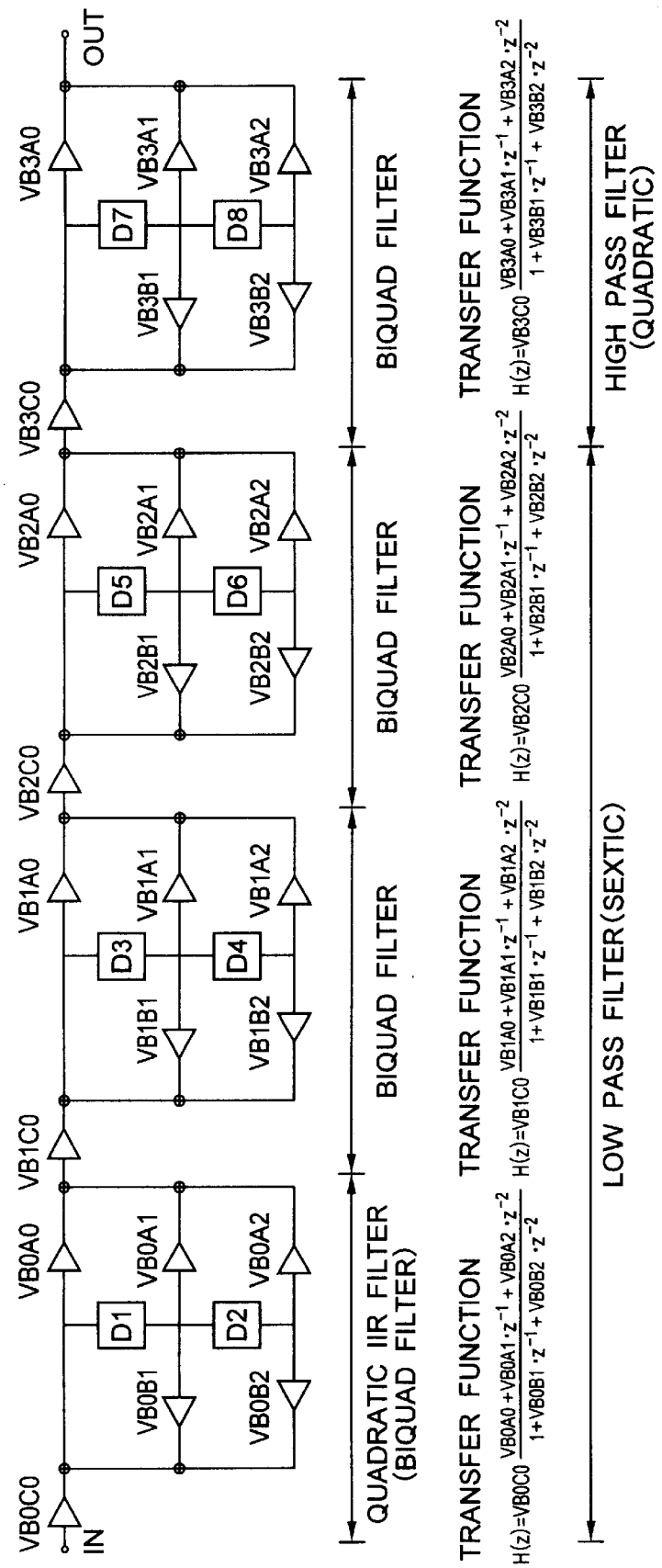
FIG. 4 is a signal flow diagram of a digital filter(band pass filter) taken as an example of a component of the voice frequency detector in the voice detecting device and voice control system according to the invention.

FIG. 4 is a signal flow diagram of a digital filter(band pass filter) taken as an example of a component of the voice frequency detector 20 in the voice detecting device and voice control system according to the present invention.

The digital filter as an example of a component of the voice frequency detector 20 includes a band pass filter (BPF) block in the example shown in FIG. 4 and an energy discriminator. The BPF block presets the voice frequency range (band) to be detected. The BPF block is supplied with a voice. The energy discriminator identifies the voice by an amount of energy of a signal coming through the BPF block.

The BPF block in the example shown in FIG. 4 realizes the setting of the frequency range of voices to be detected by using a hexadic low pass filter (LPF) and a quadratic high pass filter (HPF). LPF is made up of a cascade connection of three stages of quadratic IIR filters (biquad filters) identical in structure, and HPF is made up of one stage of quadratic IIR filter (biquad filters) having the same structure as the quadratic IIR filter forming LPF. The voice signal is input from an input terminal IN, and output from an output terminal OUT. D1, D2, D3, D4, D5, D6, D7 and D8 in FIG. 4 denote delay transfer factors, and D1, D3, D5 and D7 hold a one-cycle prior signal whereas D2, D4, D6 and D8 hold a two-cycle prior signal.

The transfer function H(z) of one quadratic IIR filter (biquad filters) shown in FIG. 4 is expressed as:

$$H(z)=VBnC0\times(VBnA0+VBnA1\cdot z^{-1}+VBnA2\cdot z^{-2})/(1+VBnB1\cdot z^{-1}+VBnB2\cdot z^{-2})\ (n=0,1,2,3)$$

As shown in the signal flow diagram of FIG. 4, since the property of LPF is determined by six coefficients VBnC0, VBnB1, VBnB2, VBnA0, VBnA1 and VBnA2 (n=0, 1, 2) per each stage of the quadratic IIR filter, the property of the entire LPF is determined by 18 coefficients. The property of HPF is determined by six coefficients VB3C0, VB3B1, VB3B2, VB3A0, VB3A1 and VB3A2.

Therefore, in case of changing the pass band of BPF, i.e. the frequency range of voices to be detected, a digital filter having the above transfer function H(z) is designed, and individual coefficients are calculated and determined.

As explained above, in the voice detecting device and voice control system according to the present invention, since preset values of frequency range, threshold value for magnitudes and range of lengths of detectable voices relative to frequencies, magnitudes and lengths of voices to be detected can be changed, remote control by voices of unspecified speakers for an apparatus normally requiring manual control can be attained by using a simple-structured, inexpensive device.

What is claimed is:

1. A voice control system comprising:

a microphone for introducing a voice;

a voice detecting device which includes a voice frequency detector for detecting the frequency of the input voice, then discriminating whether the detected frequency falls within a preset frequency range of voices to be detected, and outputting the result of the discrimination; an input signal level detector for detecting the energy level of the input voice, then comparing it to confirm whether the detected energy level exceeds a preset energy level threshold value of voices to be detected, and outputting the result of the comparison; a voice input judge part responsive to the result of discrimination by said voice frequency detector and the result of comparison by said input signal level detector to judge whether a voice satisfying conditions for voice detection has been input or not, and output a first status signal in accordance with the result of the judgement; and a voice duration measure part for measuring the duration of said first status signal, then comparing it to confirm whether the detected duration falls within a preset range of duration threshold value, and outputting a second status signal in accordance with the result of the comparison;

a control means responsive to one or both of said first status signal and said second status signal to determine whether to output a control command; and a controlled objective which executes an operation according to said control command, wherein said voice frequency detector is a digital filter including a band pass filter block for setting said frequency range of voices to be detected and supplied with a voice, and an energy discriminator for identifying the voice from a signal coming through said band pass filter block, wherein said band pass filter block is a cascade-connected low pass filter block and high pass filter block, and wherein said low pass filter block is a cascade-connected quadratic IIR filters of three stages, and said high pass filter block is a quadratic IIR filter of one stage.

* * * * *